(12) United States Patent
Vinther et al.

(10) Patent No.: US 9,144,120 B2
(45) Date of Patent: Sep. 22, 2015

(54) BACKGROUND LIGHT EFFECTS LED LIGHT FIXTURE WITH LIGHT GUIDED SECOND LIGHT SOURCES

(75) Inventors: Thomas Vinther, Beder (DK); Claus Hansen, Hornslet (DK)

(73) Assignee: Martin Professional APS, Aarhus, N. (DK)

( * ) Notice: Subject to any disclaimer, the term of this patent is extended or adjusted under 35 U.S.C. 154(b) by 0 days.

(21) Appl. No.: 13/642,237

(22) PCT Filed: Apr. 5, 2011

(86) PCT No.: PCT/DK2011/050112
§ 371 (c)(1),
(2), (4) Date: Oct. 19, 2012

(87) PCT Pub. No.: WO2011/131199
PCT Pub. Date: Oct. 27, 2011

(65) Prior Publication Data
US 2013/0038240 A1 Feb. 14, 2013

(30) Foreign Application Priority Data
Apr. 23, 2010 (DK) .................................. 2010 00361

(51) Int. Cl.
*H05B 37/00* (2006.01)
*H05B 33/08* (2006.01)
(Continued)

(52) U.S. Cl.
CPC ........... *H05B 33/0803* (2013.01); *F21S 10/023* (2013.01); *H05B 33/0857* (2013.01);
(Continued)

(58) Field of Classification Search
USPC ............................ 315/185 R, 192, 185 S, 312
See application file for complete search history.

(56) References Cited

U.S. PATENT DOCUMENTS

2006/0152691 A1   7/2006  Imade
2008/0259600 A1  10/2008  Pohlert et al.
(Continued)

FOREIGN PATENT DOCUMENTS

CN       2876546     3/2007
CN      101023709    8/2007
(Continued)

OTHER PUBLICATIONS

First Office Action; Japanese Application No. 2013-505333; Filing Date: Mar. 25, 2013; 4 pages.
(Continued)

*Primary Examiner* — Douglas W Owens
*Assistant Examiner* — Jianzi Chen
(74) *Attorney, Agent, or Firm* — Blank Rome LLP (57) ABSTRACT

The present invention relates to an illumination device comprising:
  a number of light sources arranged in at least a first group of light sources and in a second group of light sources, where said first group of light sources and said second group of light sources are individually controllable;
  a number of light collecting means, said number of light collecting means collect light from said first group of light sources and convert said collected light into a number of source light beams;
  at least one light guide comprising an input section and an output section, said light guide receives light generated by said second group of light sources at said input section and said transfer said received light to said output section, said output section being adapted to emit said received light at an area between at least two of said source light beams.

34 Claims, 10 Drawing Sheets

(51) Int. Cl.
*F21S 10/02* (2006.01)
*F21V 7/00* (2006.01)
*F21V 21/30* (2006.01)
*F21W 131/406* (2006.01)
*F21Y 101/02* (2006.01)
*G02B 5/02* (2006.01)
*G02B 26/08* (2006.01)
*F21Y 105/00* (2006.01)
*F21V 5/00* (2015.01)
*F21Y 113/00* (2006.01)
*F21V 29/67* (2015.01)
*F21V 29/74* (2015.01)
*F21Y 113/02* (2006.01)

(52) U.S. Cl.
CPC ............... *F21V5/007* (2013.01); *F21V 7/0083* (2013.01); *F21V 21/30* (2013.01); *F21V 29/677* (2015.01); *F21V 29/74* (2015.01); *F21W 2131/406* (2013.01); *F21Y 2101/02* (2013.01); *F21Y 2105/003* (2013.01); *F21Y 2113/005* (2013.01); *F21Y 2113/02* (2013.01); *G02B 5/0278* (2013.01); *G02B 26/08* (2013.01)

(56) References Cited

U.S. PATENT DOCUMENTS

| | | | | |
|---|---|---|---|---|
| 2009/0267540 A1 * | 10/2009 | Chemel et al. | ................ | 315/297 |
| 2010/0109531 A1 * | 5/2010 | Helms et al. | .................... | 315/82 |

FOREIGN PATENT DOCUMENTS

| | | | | |
|---|---|---|---|---|
| CN | 101258426 | | 9/2008 | |
| CN | 201209834 | | 3/2009 | |
| CN | 201232928 | | 5/2009 | |
| JP | 2005017576 | A | 1/2005 | |
| JP | 2006319149 | A | 11/2006 | |
| JP | 2006322968 | | 11/2006 | |
| JP | 2009266818 | A | 11/2009 | |
| JP | 2009295309 | A | 12/2009 | |
| JP | 2010225388 | | 10/2010 | |
| WO | WO2009016950 | | 2/2009 | |
| WO | WO 2009033051 | A1 * | 3/2009 | ................ F21S 8/00 |
| WO | WO2009081382 | A1 | 7/2009 | |

OTHER PUBLICATIONS

English Translation; First Office Action; Japanese Application No. 2013-505333; Filing Date: Mar. 25, 2013; 4 pages.
English Abstract; Japanese Application No. JP2005017576; 1 page, 2005.
English Abstract; Japanese Application No. JP2009266818; 2 pages, 2009.
English Abstract; Japanese Application No. JP2006319149; 2 pages, 2006.
English Abstract; Japanese Application No. JP2009295309; 2 pages, 2009.
English translation, Search Report dated Jun. 20, 2014; China Application No. 2011800204624; Filing Date: Apr. 5, 2011; 2 pages.
English translation; Second Office Action dated Mar. 17, 2014; China Application No. 2011800204624; 8 pages.
English translation, China Publication No. CN201232928; 2 pages, May 2009.
International Search Report; International Application No. PCT/DK2011/050112; International Filing Date: Apr. 5, 2011; 8 pages.
Written Opinion; International Application no. PCT/DK2011/050112; International Filing Date: Apr. 5, 2011; 10 pages.
English Abstract; Japanese Patent Application No. JP2010225388; 1 page, 2010.
English Abstract; Japanese Patent Application No. JP2006322968; 1 page, 2006.
English Abstract: Chinese Patent Application No. CN201209834; 1 page, 2012.
English translation of claims; Chinese Patent Application No. CN201209834; 1 page, 2012.
First Office Action; Chinese Patent Application No. 2011800204624; Dated: Sep. 2, 2013; 8 pages.
Search Report; Chinese Patent Application No. 2011800204624; Dated: Aug. 19, 2013; 2 pages.
English translation of First Office Action; Chinese Patent Application No. 2011800204624; 10 pages.
English translation of Search Report; Chinese Patent Application No. 2011800204624.
English abstract; Chinese Patent Application No. CN201209834; 1 page.
English abstract; Chinese Patent Application No. CN101023709; 1 page.
English abstract; Chinese Patent Application No. CN2876546; 1 page.
English abstract; Chinese Patent Application No. CN101258426; 1 page.
English abstract; International Application No. WO2009016950; 1 page.
English abstract; Japanese Patent Application No. JP2010225388; 1 page.
English abstract; Japanese Patent Application No. JP2006322968; 1 page.

* cited by examiner

BACKGROUND LIGHT EFFECTS LED LIGHT FIXTURE WITH LIGHT GUIDED SECOND LIGHT SOURCES

FIELD OF THE INVENTION

The present invention relates to an illumination device comprising a number of light sources and a number of light collecting means arranged in a housing. The number of light collecting means collect light from at least one of the light sources and convert the collected light into a number of source light beams. The light source beams are emitted from said housing.

BACKGROUND OF THE INVENTION

Light fixtures creating various effects are getting more and more used in the entertainment industry in order to create various light effects and mood lighting in connection with live shows, TV shows, sport events or as a part on architectural installation.

Entertainment light fixtures creates typically a light beam having a beam width and a divergence and can for instance be wash/flood fixtures creating a relatively wide light beam with a uniform light distribution or it can be profile fixtures adapted to project image onto a target surface. There is a tendency that more and more of this kind of fixtures are used in each show or each installation and the fixtures gets as a consequence more and more visible for the sectors or TV viewers. The light fixtures typically create the lighting effect at a distance from the light fixture it self and the light fixture is thus not as interesting and esthetic to look at. The fixture manufactures tries as a consequence to provide the fixtures with esthetic designs in order to make the fixtures more interesting to look at. However this is very difficult as the housing of the fixtures typical dependents on physical requirements defined by the technical specifications of the fixture such as optics, mechanics, electronics, cooling etc.

The LED component has further as a light source changed the look of most lighting luminaries, when using multiple LEDs to replace a single light source. This implies for all lighting industries—general, domestic, industrial, entertainment etc. The most visible change is that all multiple light sources are now exposed to the viewer and the light emits from a larger area. Now that most LED fixtures have visible LEDs, some customers dislike the look of multiple light dots. The dotted "funfair" look appears both on light fixtures which mixes the colors before the light is emitted from the housing and also of light fixtures where the colors are mixed in the air or at the wall. Instead a more uniform, even light exit is requested, to avoid the cheap looking "funfair" look with an extreme amount of light sources.

DESCRIPTION OF THE INVENTION

The object of the present invention is to solve the above described limitations related to prior art. This is achieved by an illumination device and method as described in the independent claims. The dependent claims describe possible embodiments of the present invention. The advantages and benefits of the present invention are described in the detailed description of the invention.

DETAILED DESCRIPTION OF THE INVENTION

The present invention is described in view of a moving head lighting fixture including a number of LEDs that generate a light beam, however the person skilled in the art realizes that the present invention relates to illumination devices using any kind of light source such as discharge lamps, OLEDs, plasma sources, halogen sources, fluorescent light sources, etc. and/or combinations thereof. It is to be understood that the illustrated embodiments are simplified and illustrates the principles of the present invention rather than showing an exact embodiment. The skilled person will thus understand that the present invention can be embodied in many different ways and also comprise further components in addition to the shown components.

Figure 1A:
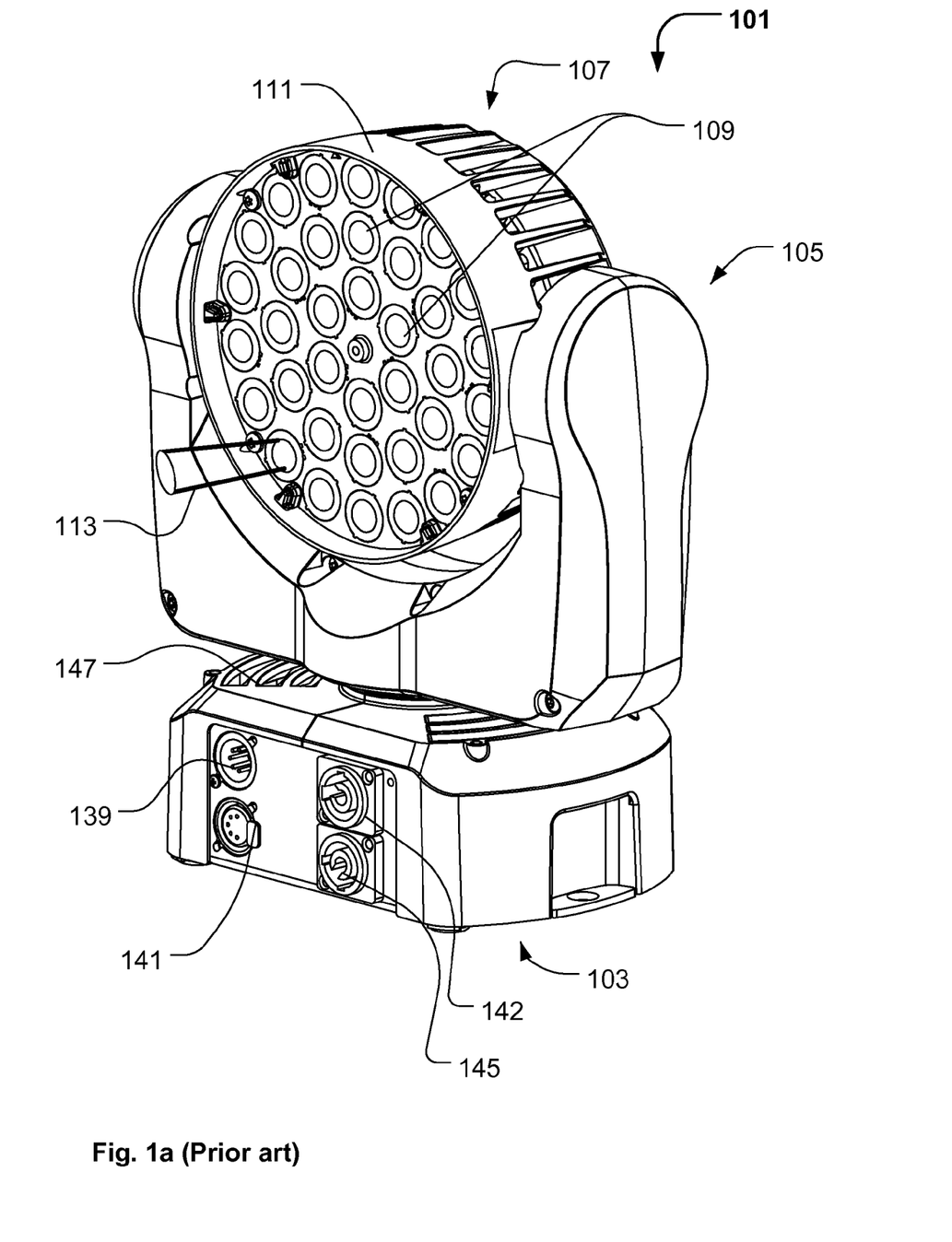
FIGS. 1a and 1b illustrate a prior art illumination device.
Figure 1B:
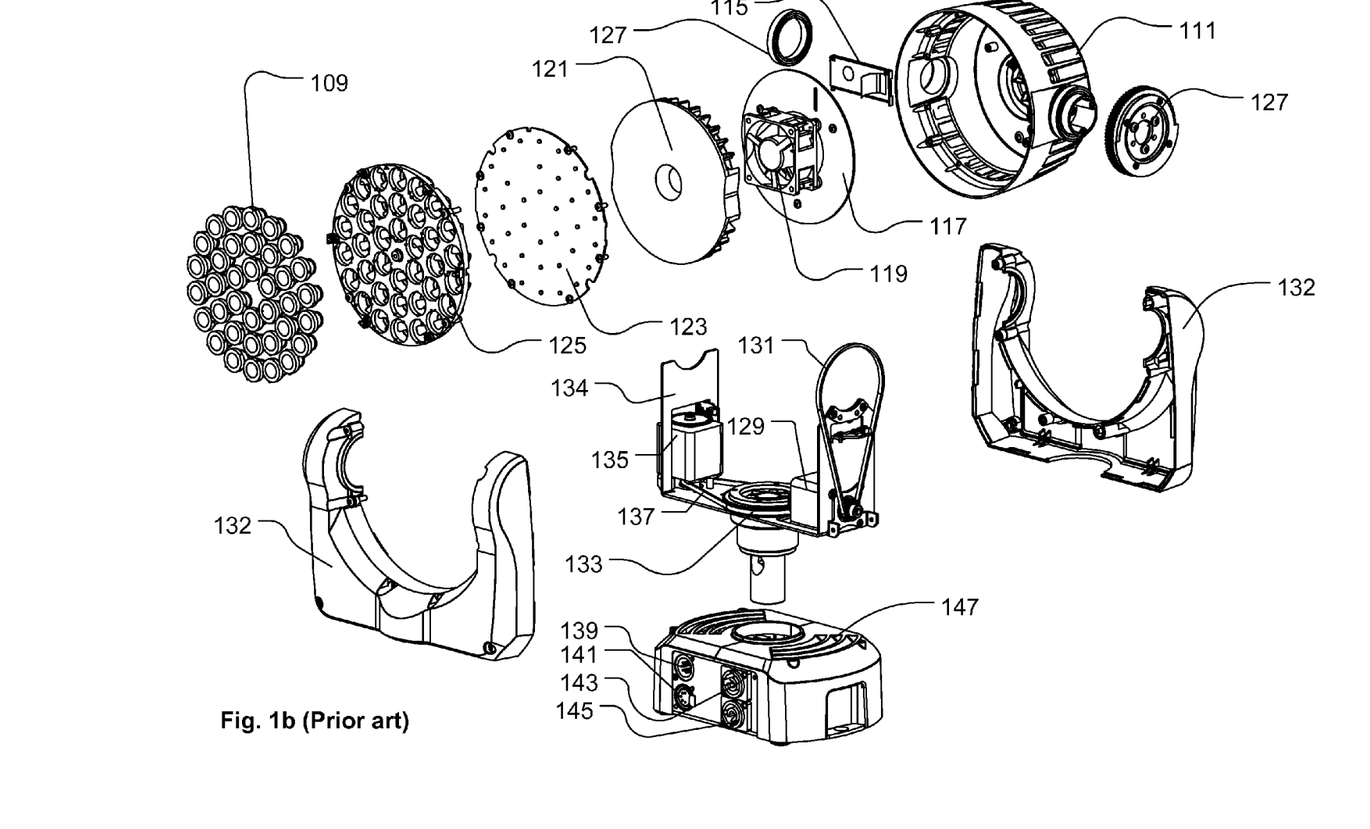

FIG. 1a-1b illustrates an illumination device according to prior art, where FIG. 1a is a perspective view and FIG. 1b is an exploded view. The illumination device is a moving head lighting fixture 101 comprising a base 103, a yoke 105 rotatable connected to the base and a head rotatable connected 107 to the yoke.

In the illustrated embodiment, the head comprises a number of light sources and a number of light collecting means 109 arranged in the head housing 111. The light collecting means collect light from at the light sources and convert the collected light into a number of source light beams 113 (only one illustrated), which are emitted from the housing.

In the illustrated embodiment the head housing 107 is a "bucket" shaped head housing 111 wherein a display 115 (visible from the rear side of the head), main PCB 117 (Printed Circuit Board), a fan 119, a heat sink 121, an LED PCB 123, and lens assembly are stacked. The lens assembly comprises a lens holder 125 and a lens array comprising the light collecting means 109. The head is rotatable connected to the yoke by two tilt bearings 127 and which are supported by the yoke 105. A tilt motor 129 is adapted to rotate the head through a tilt belt 131 connected to one of the tilt bearings 127. The yoke comprises two interlocked yoke shell parts 132 which are mounted to a yoke frame 134 where on the tilt bearings, tilt motor, pan motor and pan bearing are arranged. The LED PCB 123 comprises a number of LEDs emitting light and which in cooperation with the light collecting means 109 in the lens array generate a number of light source beams. The main PCB comprises controlling circuits and driving circuits (not shown) for controlling the LEDs as known in the art of illumination devices. The main PCB comprises further a number of switches (not shown) which extend through a number of holes in the head housing 111. The switches and display act as a user interface allowing a user to communicate with the moving head lighting fixture.

The yoke are connected to a pan bearing 133 rotatable connected to the base 103. A pan motor 135 is adapted to rotate the yoke through a pan belt 137 connected to the pan bearing 133. The base comprises 5-Pin XLR male 139 and female 141 connectors for DMX signals as known in the art of entertainment lighting; input 143 and output power 145 connectors, power supply PCB's (not shown) and fan (not shown). The fan forces air into the base through vent holes 147.

This prior art illumination device uses multiple LEDs to replace a single light source as known prior the introduction of the LED component as a widely used light source. However such illumination device changes its visible appearance as the multiple light sources are now exposed to the viewer and the light emits from a larger area. If the light luminaries are a color mixing version with single color LEDs, then all LED colors used are visible. However some customers dislike the look of multiple light dots. Instead a more uniform, even light exit is requested, to avoid the cheap looking "funfair" look with an extreme amount of light sources.

The illuminating device illustrated in FIGS. 1*a* and 1*b* is just one example of a prior art illumination derive and the skilled person realize that a large number of different embodiments provided by a large number of manufactures exits.

Figure 2A:
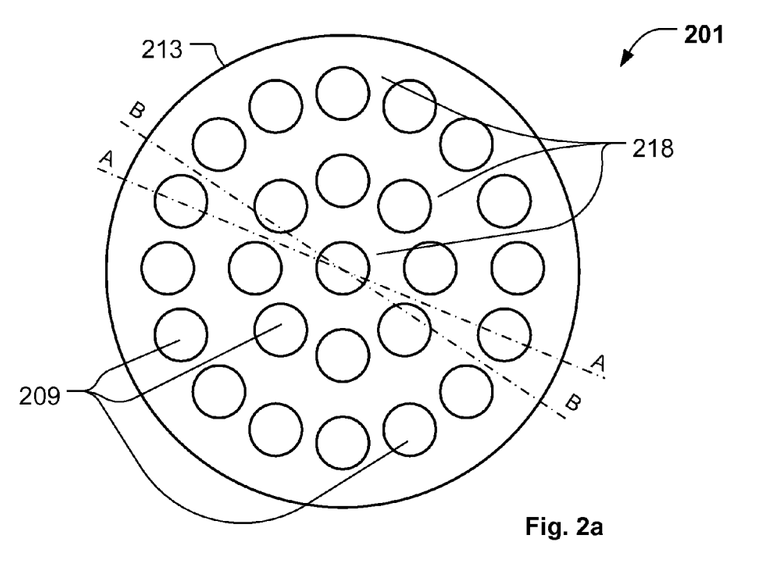
FIG. 2a-2d illustrate an embodiment of an illumination device according to the present invention.
Figure 2B:
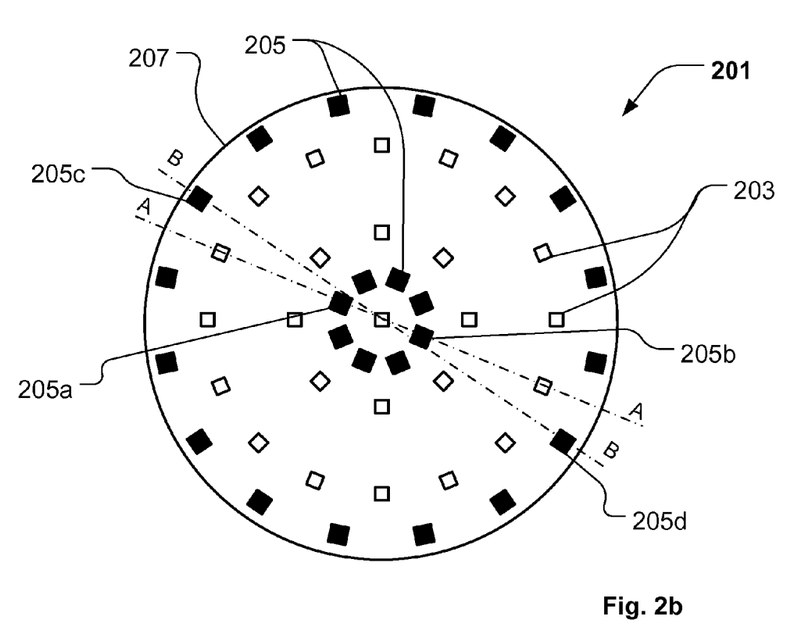
Figure 2C:
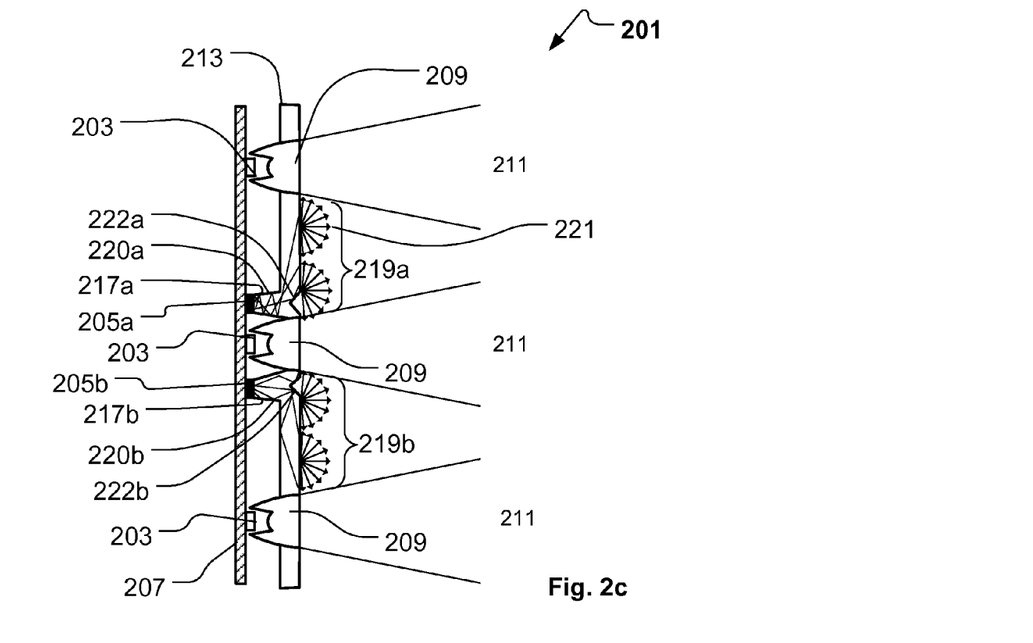

FIGS. 2*a-d* illustrate a simplified embodiment of an illumination device according to the present invention. FIG. 2*a* is a top view and FIG. 2*b* is a top view with the light guide 213 and light collecting means 209 removed. FIGS. 2*c* and 2*b* is cross sectional views along line A-A and B-B respectively.

The illumination device 201 comprises a number of light sources arranged in at least a first group of light sources 203 (indicated as white quadrangles) and in a second group of light sources 205 (indicated as black quadrangles). The light sources are mounted on a PCB 207 (printed circuit board) and the two groups of light sources can be controlled individually for instance by a controller (not shown) as known in the art of lighting. The controller is thus adapted to treat the two groups of light sources as at least two individual light sources which can be individually controlled. However the skilled person realizes that the illumination device also can be adapted to divide each group of light sources into a number of subgroups which also can be controlled individual and that it is also possible to control each single light source individually. A number of light collecting means 209 are arrange above and around the first group light sources 203 and is adapted to collect light from the first group of light sources and convert the collected light into a number of source light beams 211. The light collecting means 209 can be embodied as any optical component capable of collecting light from the light sources and convert the light into light beams and can for instance be optical lenses, light mixers, TIR lenses etc. In the illustrated embodiment the light collecting means 209 are embodied as TIR lenses as known in the prior art and the skilled person realizes that the TIR lens can be designed according the light output of the light source and the descried optical properties of the source light beam 211.

Figure 2D:
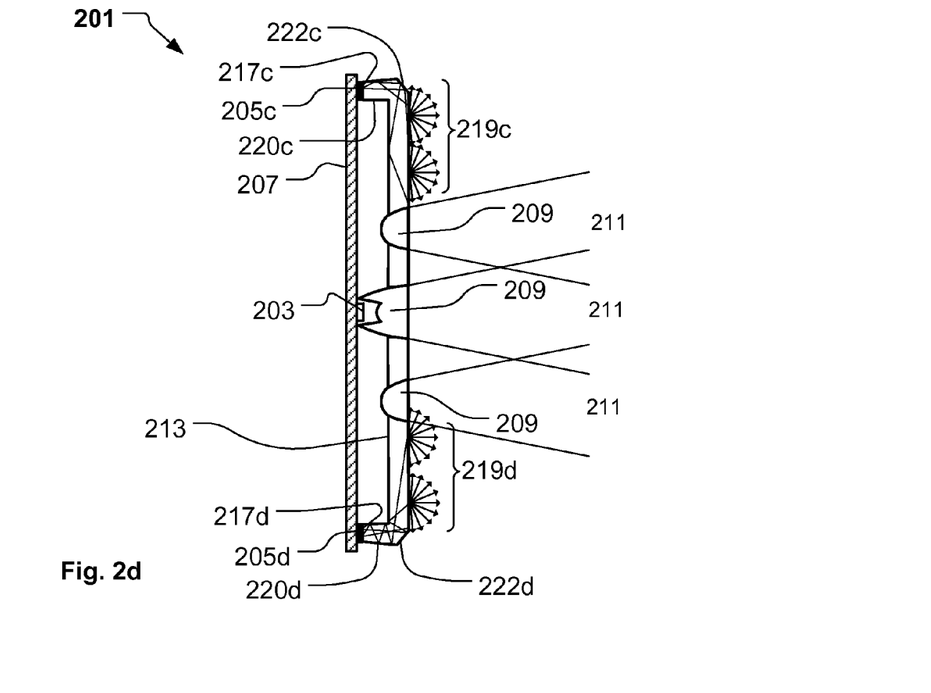

A light guide 213 is arranged above the PCB 207 and the light guide 213 comprises an input section 217 and an output section 219. The light guide receives light from the second group of light sources 205 at the input section 217 and guides the received light to the output section 219, which is adapted to emit the received light at an area 218 between at least two of the source light beams 211. The light beams 211 will merge into one large light beams as the distance to the illumination device increases. The area between at least two light source beam can be defined as all points which seen from above the light source beams lie on a straight line that intercepts at least a part of both light beams. It is to be understood that many straight lines than intercepts at least a part of both light beams and the area between the two light source beams thus constitutes a surface. Further it is to be understood that the area physically can lie below the light sources as long as it appear as being between the light sources when observed from above.

The light guide 213 is embodied as a solid transparent material and light rays entering an input section will be internally reflected to an output section where the light rays is coupled out of the light guide. In this embodiment the light guide 213 is form as a light guide disc comprising a number of openings wherein the light collecting means are arranged and a number of protrusions 220 protruding backward from the light guide disc. The protrusions are adapted to fit above the light sources 205 of the second group and the input sections are situated at the bottom surface of the protrusions. The output sections constitute the front area of the light guide disc. The light entering the input sections is firstly internally reflected through the protrusions and is then reflected at angled reflection surfaces 222 in a direction substantially along the plane of the disc.

For instance as illustrated in FIG. 2*c* the light source 205*a* belonging to the second group of light sources emits a number of light rays (illustrated as thin solid lines). The light rays enter the light guide 213 at input section 217*a* where after they experience internal reflection inside the light guide and are hereby guided to the output section 219*a* where the light rays are coupled out of the light guide 213. It is to be understood that only a small number of light rays are illustrated inside the light guide and that in total a large number of light beams will be emitted in a large number of directions as indicated by arrows 221. In a similar way the light source 205*b* belonging to the second group of light sources emits a number of light rays (illustrated as thin solid lines) which enter the light guide 213 at input section 217*b* and is coupled out of the light guide 213 at output section 219*b*. Further in FIG. 2*d* light sources 205*c* and 205*d* generates light beams which is emitted from output sections 219*c* and 219*d* respectively. The result is that the areas between the light beams can be illuminated by the second group of light sources 205 and the dotted look the prior art light fixtures can be avoided.

The output sections 219 are adapted to couple the light rays out of the light guide.

This can for instance be achieved by adjusting the roughness of the surface of the light guide at the output sections whereby the light rays does not experience total internal reflection when they hit the rough surface and as consequences the light is coupled out of the light guide. Alternatively the surface of the light guide 213 can be treated with a material which will scatter the light hitting the output section. Another opportunity is to angle to bottom and top surface of the light guide relatively to each other, which results the fact the incident angle of the light rays traveling inside the light guide will change. The output sections can be adapted to couple the light out of the light guide in a homogenized way such that the entire front surface of the light guide disc appears as one homogeneous illuminating surface. This can for instance be achieved by gradually modifying the roughness across the output sections such that only a small part of the light is coupled out at output sections close to the input sections, whereas a larger part of the light is coupled out of the light guide at areas farther from the input section. The light guide and out coupling can for instance be constructed using techniques known in the art of background lighting from TV displays and/or mobile phone displays. In the illustrated embodiment the light guide is shaped as a disc however it is be understood that the light guide can have any shape.

Figure 3A:
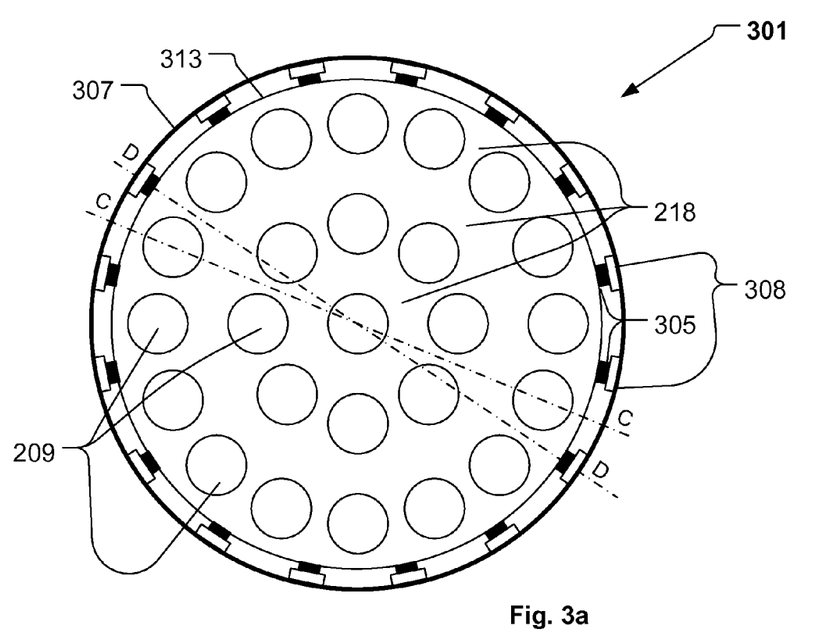
FIG. 3a-3d illustrate another embodiment of the illumination device according to the present invention.
Figure 3B:
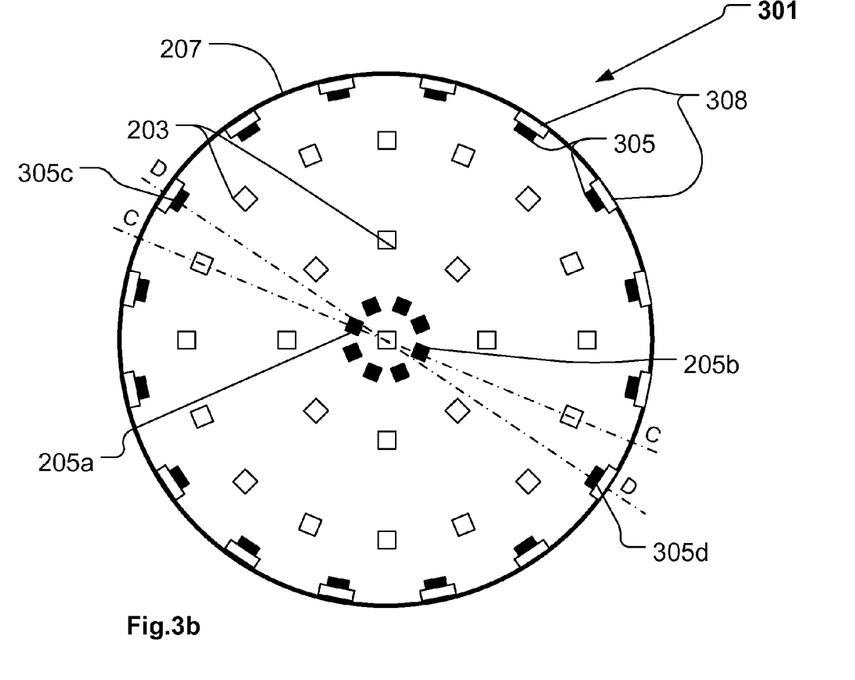
Figure 3C:
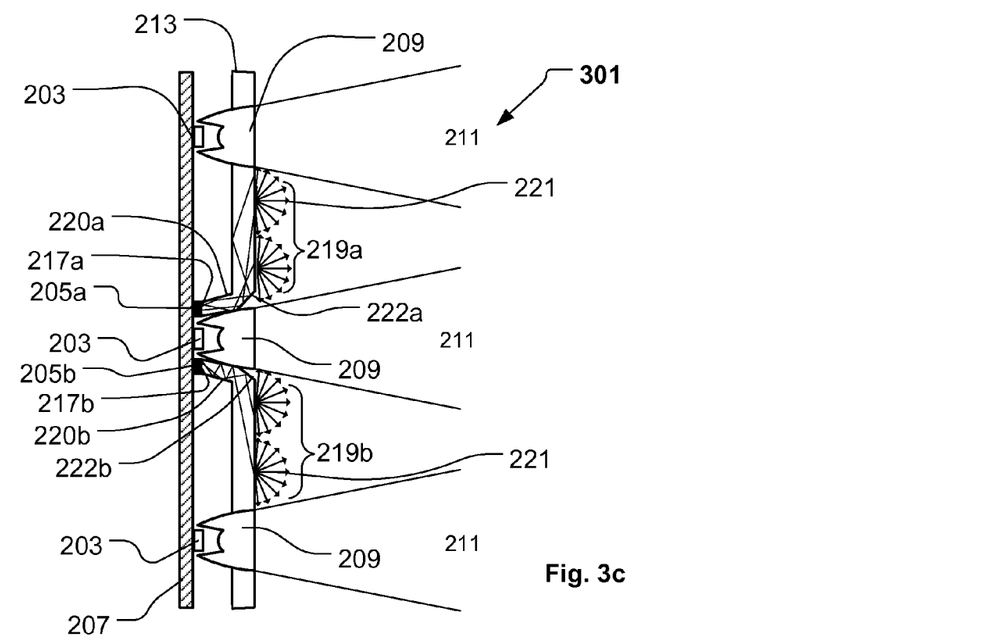
Figure 3D:
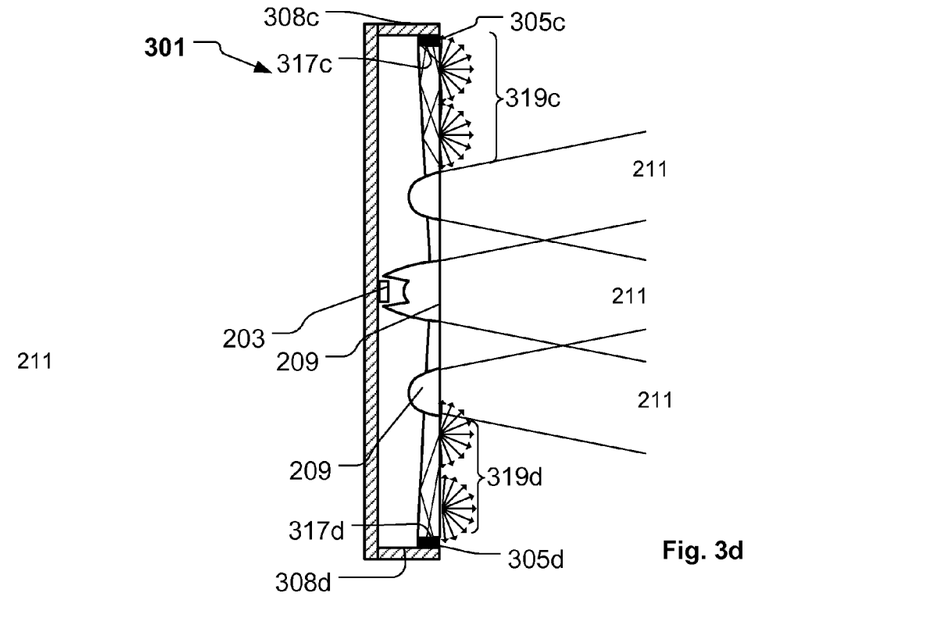

FIGS. 3a-3d illustrate another embodiment of an illumination device according to the present invention. FIG. 3a is a top view and FIG. 3b is a top view with the light guide 313 and light collecting means 209 removed. FIGS. 3c and 3d is cross sectional views along line C-C and D-D respectively. Like the embodiment illustrated in FIG. 2a-2d the first group of light sources 203 (indicated as white quadrangles) is arrange on a PCB 207 with the light colleting means 209 arranged above the light sources and a number of source light beams 211 are hereby created. In this embodiment at part of the light sources of the second group 205 are mounted on the PCB 207 as in FIG. 2a-2d. The light source 205a and 205b emits a number of light rays (illustrated as thin solid lines) which enter the light guide 313 respectively at input section 217a and 217b and is coupled out of the light guide 313 at output sections 219a and 219b. However another part 305 of the second group light sources are arrange circumferentially around the light guide 313 and mounted on a number of upstanding PCBs 308 which are perpendicularly in relation to PCB 207. The consequence it that the circumferential wall of the light guide 313 can act as input sector 317. As illustrated in FIG. 3d the source 305c and 305d emit a number of light rays (illustrated as thin solid lines) which enter the light guide 313 respectively at input section 317c and 317d and is coupled out of the light guide 313 at output sections 319c and 319d. It is to be understood that the inner ring of light sources also can be adapted to emit light directly into the light guide for instance by arranging these light sources around the center light collecting means and letting the light sources emit light outwardly in relation the center of the light guide.

Figure 4:
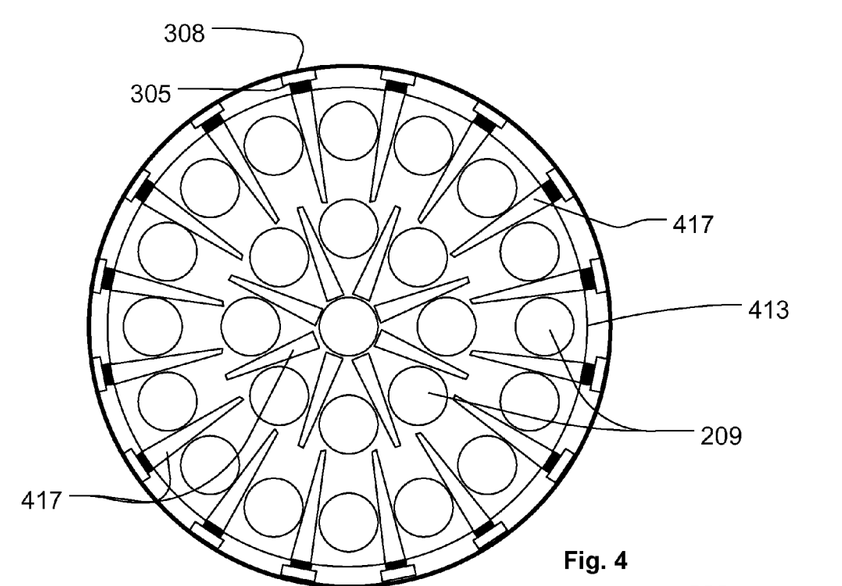
FIG. 4 illustrates another embodiment of the illumination device of FIG. 3a-3d.
Figure 6A:
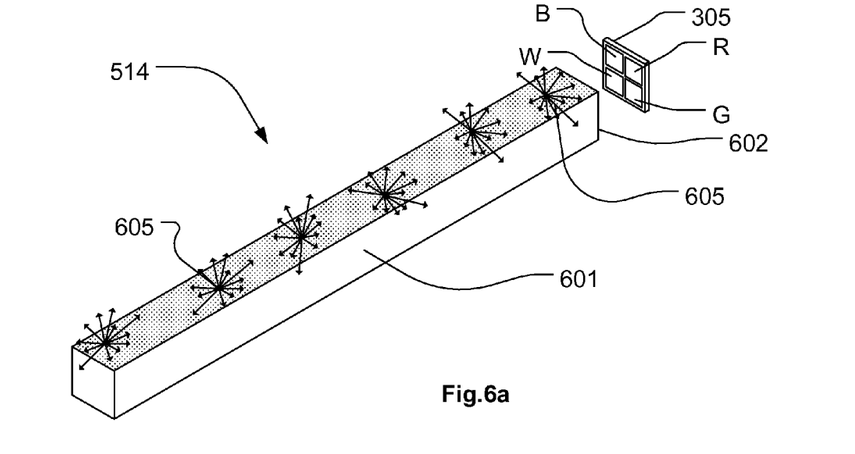
FIGS. 6a and 6a illustrates possible embodiments of light guides which can be used in the illumination device according to the present invention.
Figure 6B:
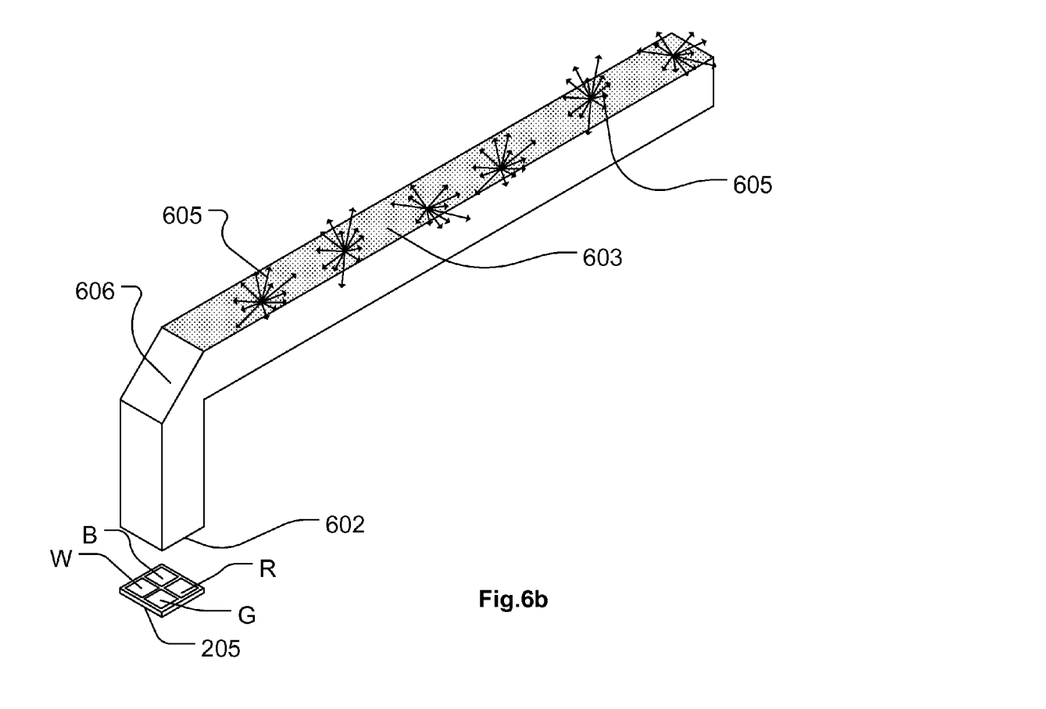

FIG. 4 illustrates an embodiment which is similar to the embodiment in FIG. 3a-3d, however the light guide 413 have been modified, such that the output sections 417 have been arrange in a predetermined pattern and light will thus only exit the light guide at these areas. The consequence is that the second group of light sources can be used to create an optical pattern between the light beams and this optical pattern can be used to create light effects which can be observed by a spectator looking at the illumination device. The light sources can be arranged such light from one or a sub-group of light sources illuminated a specific output section and the illumination device can be adapted to control the sub-groups individually. This makes it possible to control different part of the optical pattern individually for instance by turning on/off, changing color certain parts of the predertertmined pattern. The predetermined pattern can in this way be used as a dynamic pattern which can be used to crate several of interesting light effects. The predetermined pattern of the light guide 413 can for instance be created by treating the upper surface of the light guide in predetermined pattern such that light is only coupled out of the light guide at these areas while the light rays experience internal reflection at the other areas. It also possible to achieve the same effect by using a multiple number of light guides which acts as individual light guides (for instance as illustrated in FIGS. 6a and 6b) rather than being integrated as one light guide disc.

Figure 5A:
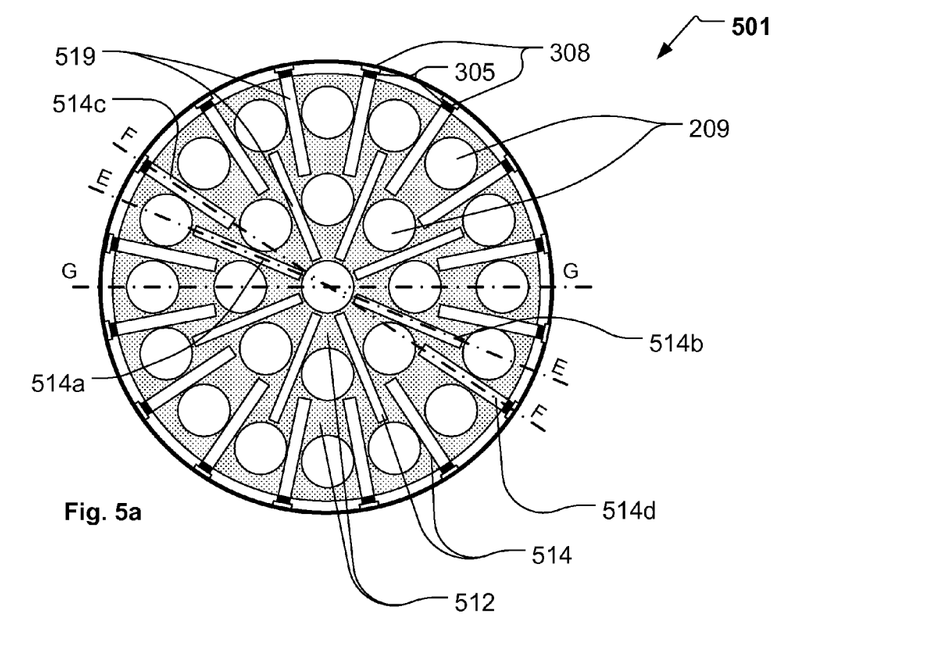
FIG. 5 illustrates an another embodiment of the illumination device according the present invention.
Figure 5B:
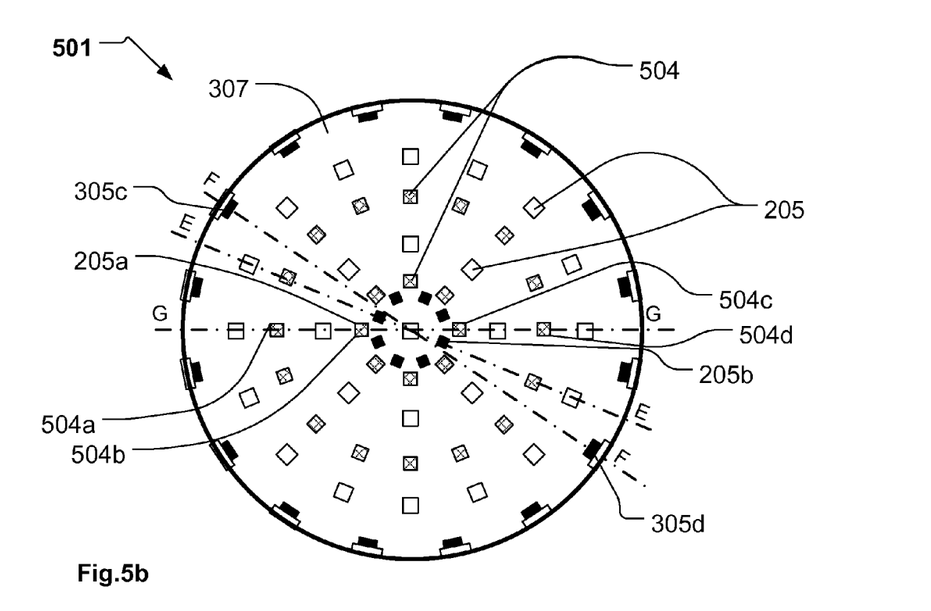
Figure 5C:
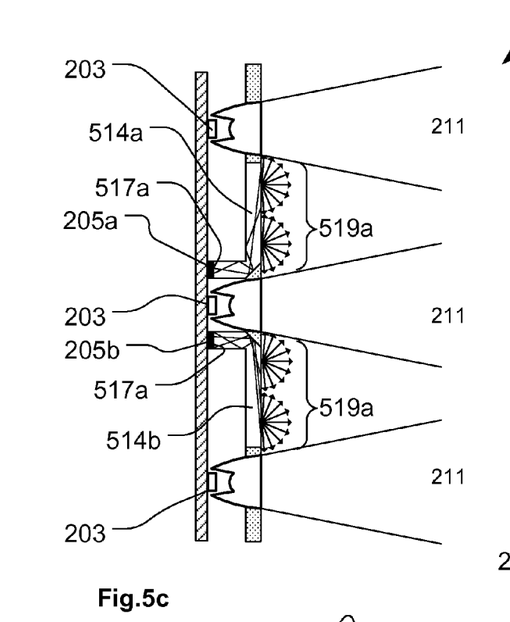
Figure 5D:
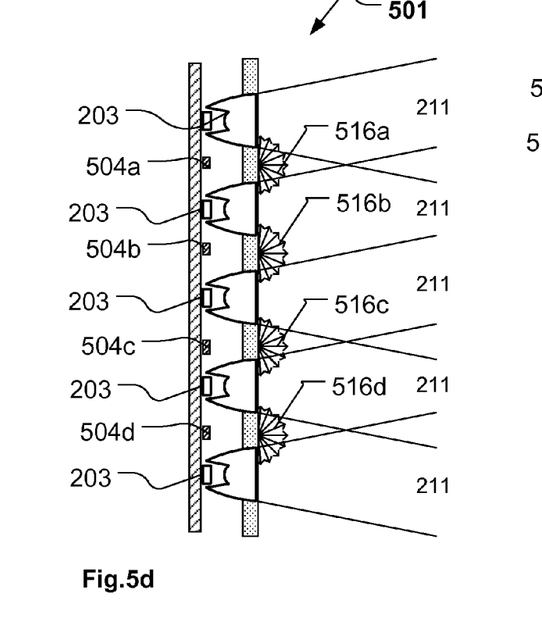
Figure 5E:
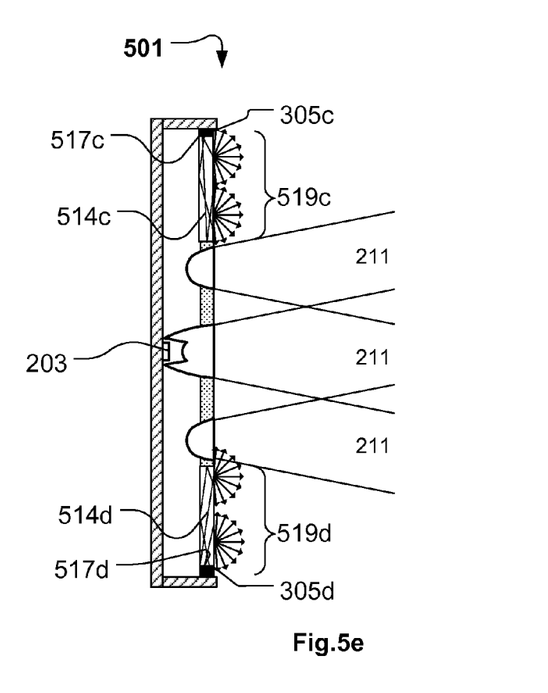

FIGS. 5a-5e illustrates another embodiment of an illumination device according to the present invention. FIG. 5a is a top view and FIG. 5b is a top view with the light guides 513, collecting means 209 removed and diffuser regions 512 removed. FIGS. 5c, 5d and 5e is cross sectional views along line E-E, F-F and G-G respectively. Like the embodiment illustrated in FIG. 3a-3d the first group of light sources 203 (indicated as white quadrangles) is arrange on a PCB 207 with the light colleting means 209 arranged above the light sources and a number of source light beams 211 are hereby created. As in FIG. 3a-3d a part of the light sources of the second group 205 (illustrated in black quadrangles) are mounted on the PCB 207 while another part 305 of the second group light sources are arranged on number of upstanding PCBs 308 which are perpendicularly in relation to PCB 207. A number of light guides 514 (illustrated in detailing in FIGS. 6a and 6b) comprising an input section and output section is arranged above the PCB 207. The light guides 514 is adapted to receive light from at least one the second group light sources at the input section and to guide the received light to the output section 519, which is adapted to emit the received light at an area between at least two of the source light beams 211.

In this embodiment the illumination device comprises a third group of light sources 504 (illustrated as cross-hatched quadrangles) arranged on the PCB 207 and a number of diffuser regions 512 arranged above the PCB 207 and between at least two light source beam. The diffuser regions 514 is adapted to receive light from at least one of the light sources of the third group of light sources and to diffuse the received light.

As illustrated in FIG. 5c light source 205a and 205b emits a number of light rays (illustrated as thin solid lines) which respectively enters light guide 514a and 514b at input sections 517a and 517b and is coupled out of the light guide 514a and 514b at output sections 519a and 519b. As illustrated in FIG. 5d the source 305c and 305d emit a number of light rays (illustrated as thin solid lines) which respectively enter the light guide 514c and 514d at input section 517c and 517d and is coupled out of the light guides at output sections 519c and 519d. As illustrated in FIG. 5e light sources 504a-d will illuminate the diffraction regions 512a-d and the light from these light sources will be diffused into many directions as illustrated by arrows 516a-516d. The consequence is that the dotted look of an illumination device as known in the prior art can be avoided and the illumination device can at the same time be used to crated graphical light effects by controlling the second group of light sources.

The diffuser regions can for instance be embodied as one single solid body of a transparent material, which is adapted to diffuse light hitting the solid body. For instance by molding the solid body in transparent polymer and treating the surfaces such that they will diffuse light. The solid body can be contracted with a number of holes were in the light collecting means 209 and light guides 514 can be arranged.

FIG. 6a and FIG. 6b respectively illustrated the two types light guides used in FIGS. 5a-5e. The light guide in FIG. 6a correspond the light guides 514 (for instance 514c and 514d of FIG. 5a-e) which are adapted to receive light form the light sources 305 arranged circumferentially around the PCB 207. The light guide is constructed of a transparent rod 601 comprising an input section 602 and an output section 603. The output section constitutes one surface of the rod and has been treated such that the light will be coupled out of this surface as illustrated by arrows 605. In this embodiment the light source 305 is a 4 in 1 LED light source comprising a red die R, Green die G, blue die B and white die W and can thus create a large amount of different color by using additive color mixing. The light rod assists also in mixing the colors from the 4 LED dies. The light guide in FIG. 6b correspond the light guides 514 (for instance 514a and 514b of FIG. 5a-e) which are adapted to receive light form the light sources 205 on the PCB 207. This light guide comprises a bend 606 which is adapted to reflect light coming from the input section towards the output section 603.

Figure 7:
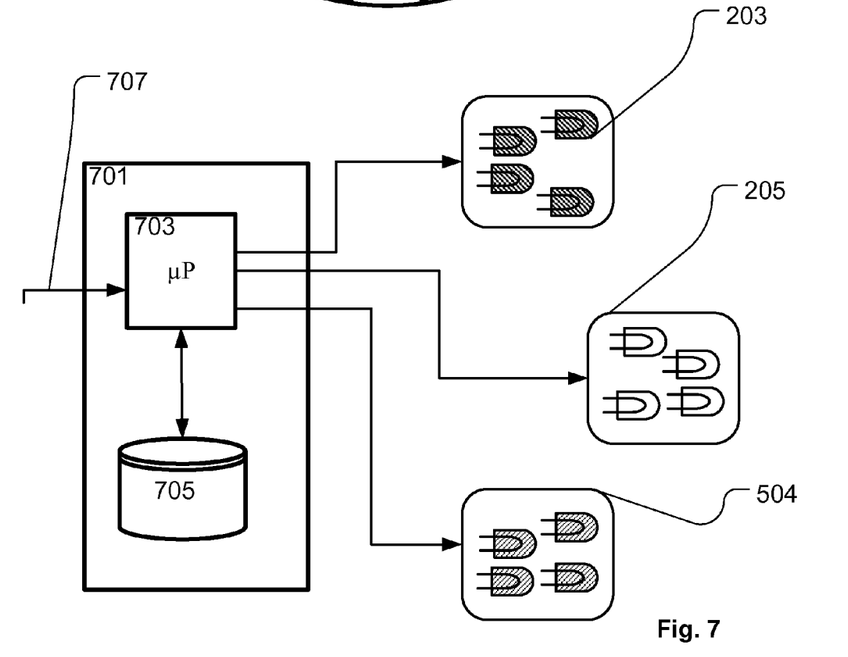
FIG. 7 illustrates a structural block diagram of an illumination device according to the present invention.

FIG. 7 illustrates a block diagram of the illumination device according the present invention. The illumination device comprises a control unit 701 comprising a processor 703 and a memory 705. The first group of light sources 203 and the second group of light sources 205 is connected to the control unit 701 and is arranged according to the present invention. The processor acts as controlling means and is adapted to control the first group 203 of light sources and the second group 205 of light sources individually. Meaning the processing means can control one of the groups of light sources without controlling the other group of light sources. The controlling can for instance adapted to control the color and/or intensity of the light sources and can be based on any type of communication signals known in the art of lightning e.g. PWM, AM, FM, binary signals etc. The first 203 and second 205 group of light sources array can thus be controlled individually and independently of each other can thus be treated as two individually and independently groups of light sources. It is to be understood that the individually light sources of each groups be controlled by the same control signal, supplied with individual control signals and/or grouped in subgroups where each subgroup receive the same control signal.

In one embodiment the controlling means is adapted to control said first group of light sources based on an input signal indicative of a first target color of said first group of light sources. The input signal can be any signal capable of communication parameters and can for instance be based on one of the following protocols USITT DMX 512, USITT DMX 512 1990, USITT DMX 512-A, DMX-512-A including RDM as covered by ANSI E1.11 and ANSI E1.20 standards or Wireless DMX. ACN designates Architecture for Control Networks; ANSI E1.17-2006).

The input signal can for instance be indicative of a first target color can be any parameter defining the color of the light that the first group light sources shall generate, for instance RGB values, color coordinates in color maps etc. The controlling means can be adapted to control the second group of light sources based on the input signal indicative of the first target color of whereby the second group of light sources can be adapted generate substantial the same color as the color generated by the first group of light sources. However it is also possible to integrate a color scheme such that the color of the second array is adjusted such that the color of the second group of light sources is different but esthetic matches each other according to a predetermined color scheme. The input signal can also be indicative of a second target color and the color of the second group of light sources can be controlled based on this second target color parameter.

The skilled person realizes that the illumination device also can comprise a third group 504 of light sources as illustrated in connection with FIG. 5*a-e*. This group can be controlled in similar manners as the two other groups of light sources.

The second and third group of light sources can functions as background lighting with own DMX control and both color and intensity can be varied independently of the first group of light sources. They can also be intensity and color linked with primary LED color in a predetermined manner or has separate control for contrast colors or other intensity. This adjustment/control of the light sources can be done remotely from central control unit or at the fixture itself. The consequence is that a new light effect can be created as the area between the light beams can have another color emitted by the second group of light sources. This look can by dynamic if first group of light sources and the second group of light sources are independently controlled as known in the art of entertainment lighting.

It is noted that:

the Invention applies to both multichip LEDs and single color LEDs.

the Invention applies to both profile and wash luminaires.

the invention applies to any light source technology.

that the invention eliminates or minimizes the dotted look of an LED lighting fixture with multiple LED lenses exposed to the spectator.

the second light source group can be used as new additional effect feature on the fixture and function both as an attention gimmick, but more importantly as an individual pixel when used in multiple unit setups. So it is both a mid-air beam and a lit up surface.

the second light source group can also be used to indicate errors or other fixture status information.

the invention creates a possibility of making the light/color visible from other angles than purely from the front.

the secondary light source can be used as an interactive part of the fixture—reacting according to surroundings.

the illumination device according to the present invention when the fixture is used in multiple unit setups (eg. a large scale matrix) the primary light source can be turned off or dimmed, so the fixture changes from being an automated mid-air beam to become a graphical pixel with a glowing non-blinding surface. Appropriate effect generator controls (eg. media servers) are then able to display video content or simple color waves/patterns on the complete fixture setup.

the user will be able to run two individual light sequences or media content on the same fixture. —one content generated by the first group of light sources and another content generated by the second group of light sources.

That error messages or fixture status can be communicated via colors, color combinations, flashes or other effects by the secondary light source that via an internal or external sensoring/tracking technology, the secondary light source can act according to a predefined reaction pattern (color, intensity or flashing). The input could be persona behavior, temperature changes, room light level, humidity etc.)

The invention claimed is:

1. An illumination device comprising:

a number of light sources arranged in at least a first group of light sources and a second group of light sources, wherein said first group of light sources and said second group of light sources are individually controllable;

a number of light collectors collecting light from said first group of light sources and converting said collected light into a number of source light beams; and at least one light guide comprising an input section and an output section, said light guide receiving light generated by said second group of light sources at said input section and transferring said received light to said output section, said output section comprising an area completely surrounding at least one of the said light collectors and being adapted to emit said received light at the area, wherein said light guide is formed as a light guide disc comprising a number of openings wherein said light collectors are arranged, and wherein a front area of the light guide disc comprises said output section and said output section is adapted to diffuse said emitted light into many directions.

2. The illumination device according to claim 1 wherein said illumination device comprises a controller adapted to individually control said first group of light sources and said second group of light sources.

3. The illumination device according to claim 2 wherein said controller is adapted to control said first group of light sources based on an input signal indicative of a first target color.

4. The illumination device according to claim 3 wherein said controller is adapted to control said second group of light sources based on said first target color.

5. The illumination device according to claim 2 wherein said input signal being further indicative of a second target color and said controller is adapted to control said second group of light sources based on said second target color.

6. The illumination device according to claim 1 wherein said output sections and said light sources of said second group of light sources are arranged in a predetermined pattern, such that each of said output sections emit light from at least one of said light sources of said second group of light sources and said controller is adapted to control said light sources illuminating each output section individually.

7. The illumination device according to claim 1 wherein said number of light sources is further arranged in a third group of light sources and said illumination device further comprises at least one diffuser region arranged between at least two of said source light beams, said diffuser region receives and diffuses light generated by said third group of light sources.

8. A moving head light fixture comprising:
a base;
a yoke rotatably connected to said base; and
a head rotatably connected to said yoke,
wherein said head comprises an illumination device according to claim 1.

9. A method of controlling an illumination device comprising the steps of:
arranging a number of light sources in at least a first group of light sources and a second group of light sources;
creating a number of light source beams by adapting a number of light collectors to collect light from said first group of light sources and to convert said collected light into said number of light source beams;
guiding said light source beams through a number of openings in a light guide disc; and
guiding light generated by said second group of light sources to an area between at least two of said light source beams by:
emitting light into said light guide disc through an input section;
transferring said light to an output section, said output section being formed at a front area of said light guide disc and positioned completely surrounding at least one of said openings in said light guide disc; and
coupling said light out of said light guide disc through said output section,
wherein said coupling said light out of said light guide comprises diffusing said light in many directions.

10. The method according to claim 9 wherein said method further comprises the steps of:
controlling said first group of light sources based on a first target color; and
controlling said second group of light sources based on a second target color.

11. The method according to claim 10 wherein said method further comprises the step of:
determining at least said second target color based on said first target color.

12. The method according to claim 9 wherein said method further comprises the steps of:
arranging said number of light sources further into a third group of light sources;
illuminating an area between at least two of said light source beams by providing a diffuser between at least two of said light source beams and by adapting said diffuser to receive light generated by said third group of light sources and to diffuse said received light.

13. The method according to claim 12 wherein said method further comprises the step of:
controlling said third group of light sources based on a third target color.

14. An illumination device comprising:
a number of light sources arranged in at least a first group of light sources and in a second group of light sources, wherein said first group of light sources and said second group of light sources are individually controllable;
a number of light collectors collecting light from said first group of light sources and converting said collected light into a number of source light beams; and
at least one light guide comprising an input section and an output section, said light guide receiving light generated by said second group of light sources at said input section transferring said received light to said output section, said output section being adapted to emit said received light at an area between at least two of said source light beams, wherein said light guide is formed as a light guide disc comprising a number of openings where said light collectors are arranged, and wherein a front area of the light guide disc comprises said output section, wherein a circumferential wall of said light guide disc comprises said input section and wherein a part of the second group of light sources are arrange circumferentially around the light guide disc, wherein a light-emission axis of each of the light sources in the second group of light sources is in a direction along the plane of said light guide disc.

15. An illumination device according to claim 14 wherein said output section is adapted to diffuse said emitted light in many directions.

16. An illumination device according to claim 14 wherein said illumination device comprises a controller adapted to individually control said first group of light sources and said second group of light sources.

17. An illumination device according to claim 16 wherein said controller is adapted to control said first group of light sources based on an input signal indicative of a first target color.

18. An illumination device according to claim 17 wherein said controller is adapted to control said second group of light sources based on said first target color.

19. An illumination device according to claim 17 wherein said input signal being further indicative of a second target color and in that said controller is adapted to control said second group of light sources based on said second target color.

20. An illumination device according to claim 14 wherein said output sectors and said light sources of said second group of light sources are arranged in a predetermined pattern, such that each of said output sectors emits light from at least one of said light sources of said second group and in that a controller are adapted to control said second light sources illuminating each output sector individually.

21. An illumination device according to claim 14 wherein said number of light sources further is arranged in a third group of light source and in that said illumination device further comprises at least one diffuser region arranged between at least two of said source light beams, said diffuser region receives and diffuses light generated by said third group of light sources.

22. A moving head light fixture comprising:
a base;
a yoke connected rotatable to said base; and
a head connected to rotatable said yoke,
wherein said head comprises an illumination device according to claim 14.

23. An illumination device comprising:
a number of light sources arranged in at least a first group of light sources and in a second group of light sources, where said first group of light sources and said second group of light sources are individually controllable;
a number of light collectors collecting light from said first group of light sources and converting said collected light into a number of source light beams; and
at least one light guide comprising an input section and an output section, said light guide receiving light generated by said second group of light sources at said input section transferring said received light to said output section, said output section being adapted to emit said received light at an area between at least two of said source light beams, wherein said light guide is formed as a light guide disc comprising a number of openings where said light collectors are arranged, wherein a front area of the light guide disc comprises said output section, wherein said light guide disc comprises an angled refection surface disposed a long a circumference of said light guide disc, and wherein said reflection surface is configured to reflect said light entering said input section in a direction along the plane of said light guide disc.

24. An illumination device according to claim 23 wherein said light guide disc comprise number of protrusions protruding backward from said light guide disc and where said bottom surface of said protrusions comprises said input section and where said protrusions are provided below said angled refection surface.

25. An illumination device according to claim 24 wherein said output section is adapted to diffuse said received light.

26. An illumination device according to claim 24 wherein said illumination device comprises a controller adapted to individually control said first group of light sources and said second group of light sources.

27. An illumination device according to claim 24 wherein said controller is adapted to control said first group of light sources based on an input signal indicative of a first target color.

28. An illumination device according to claim 27 wherein said controller are adapted to control said second group of light sources based on said first target color.

29. An illumination device according to claim 24 wherein said input signal being further indicative of a second target color and in that said controller are adapted to control said second group of light sources based on said second target color.

30. An illumination device according to claim 24 wherein said output sectors and said light sources of said second group of light sources are arranged in a predetermined pattern, such that each of said output sectors emits light from at least one of said light sources of said second group and in that said controller are adapted to control said light sources illuminating each output sector individually.

31. An illumination device according to claim 24 wherein said number of light sources further is arranged in a third group of light source and in that said illumination device further comprises at least one diffuser region arranged between at least two of said source light beams, said diffuser region receives and diffuses light generated by said third group of light sources.

32. A moving head light fixture comprising:
a base;
a yoke connected rotatable to said base; and
a head connected to rotatable said yoke,
wherein said head comprises an illumination device according to claim 24.

33. An illumination device comprising:
a number of light sources arranged in at least a first group of light sources and in a second group of light sources, where said first group of light sources and said second group of light sources are individually controllable;
a number of light collectors collecting light from said first group of light sources and converting said collected light into a number of source light beams, wherein each of said collectors is arranged above and around one of said light sources of said first group; and
at least one light guide comprising an input section and an output section comprising an area completely surrounding at least one of said light collectors, said light guide receiving light generated by said second group of light sources at said input section and transferring said received light to said output section, said output section being adapted to emit said received light at the area.

34. An illumination device comprising:
a number of light sources arranged in at least a first group of light sources and in a second group of light sources, where said first group of light sources and said second group of light sources are individually controllable;
a number of light collectors collecting light from said first group of light sources and converting said collected light into a number of source light beams; and
at least one light guide comprising an input section and an output section, said light guide receiving light generated by said second group of light sources at said input section transferring said received light to said output section, said output section being adapted to emit said received light at an area between at least two of said source light beams, wherein said light guide is formed as a light guide disc comprising a number of openings where said light collectors are arranged, wherein a front area of the light guide disc comprises said output section, wherein said light guide disc comprises a refection surface angled inwardly into the front area of the light guide disc, and wherein said reflection surface is configured to reflect said light entering said input section in a direction along the plane of said light guide disc.

* * * * *